US008263150B2

(12) United States Patent
Graumlich et al.

(10) Patent No.: US 8,263,150 B2
(45) Date of Patent: *Sep. 11, 2012

(54) BEVERAGE COMPOSITIONS HAVING LOW LEVELS OF PRESERVATIVE WITH ENHANCED MICROBIAL STABILITY

(75) Inventors: Thomas Ray Graumlich, West Harrison, IN (US); Robert Joseph Schaar, Edgewood, KY (US); Joseph John Buechel, Terrace Park, OH (US); Galen Edward Downton, Fairfield, OH (US); John William Wegman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 420 days.

This patent is subject to a terminal disclaimer.

(21) Appl. No.: 10/307,656

(22) Filed: Dec. 2, 2002

(65) Prior Publication Data

US 2003/0134017 A1 Jul. 17, 2003

Related U.S. Application Data

(60) Provisional application No. 60/341,982, filed on Dec. 19, 2001.

(51) Int. Cl.
*A23L 2/00* (2006.01)
(52) U.S. Cl. .............. 426/330.3; 426/590; 426/532; 426/326; 426/599
(58) Field of Classification Search ............... 426/590, 426/532, 330.3
See application file for complete search history.

(56) References Cited

U.S. PATENT DOCUMENTS

| | | | |
|---|---|---|---|
| 2,661,349 A | 12/1953 | Caldwell et al. | |
| 2,846,317 A | 8/1958 | Bersworth et al. | |
| 2,847,308 A | 8/1958 | Bersworth et al. | |
| 3,202,515 A | 8/1965 | Stone | |
| 3,404,987 A | 10/1968 | Kooistra et al. | |
| 3,455,838 A | 7/1969 | Marotta et al. | |
| 3,483,033 A | 12/1969 | Casey | |
| 4,066,794 A | 1/1978 | Schur | |
| 4,338,346 A | 7/1982 | Brand | |
| 4,343,934 A | 8/1982 | Jenner et al. | |
| 4,399,163 A | 8/1983 | Brennan et al. | |
| 4,411,925 A | 10/1983 | Brennan et al. | |
| 4,423,029 A | 12/1983 | Rizzi | |
| 4,435,440 A | 3/1984 | Hough et al. | |
| 4,460,617 A | 7/1984 | Barndt et al. | |
| 4,705,690 A | 11/1987 | Brand et al. | |
| 4,705,691 A | 11/1987 | Kupper et al. | |
| 4,717,579 A | 1/1988 | Vietti et al. | |
| 4,737,375 A | 4/1988 | Nakel et al. | |
| 4,748,033 A | 5/1988 | Syfert et al. | |
| 5,021,251 A | 6/1991 | McKenna et al. | |
| 3,681,091 A | 8/1992 | Kohl et al. | |
| 5,336,510 A | 8/1994 | Chang | |
| 5,431,940 A | 7/1995 | Calderas et al. | |
| 5,433,965 A | 7/1995 | Fischer et al. | |
| 5,773,062 A | 6/1998 | Cirigliano et al. | |
| 6,007,856 A | 12/1999 | Cox et al. | |
| 6,036,986 A | 3/2000 | Cirigliano et al. | |
| 6,126,980 A | 10/2000 | Smith et al. | |
| 6,132,787 A * | 10/2000 | Bunger et al. | 426/330.3 |
| 6,261,619 B1 | 7/2001 | Calderas et al. | |
| 6,265,008 B1 | 7/2001 | Smith et al. | |
| 6,268,003 B1 | 7/2001 | Calderas et al. | |
| 6,294,214 B1 | 9/2001 | Calderas et al. | |
| 6,326,040 B1 | 12/2001 | Kearney et al. | |
| 6,376,005 B2 * | 4/2002 | Bunger et al. | 426/597 |
| 6,703,056 B2 * | 3/2004 | Mehansho et al. | 426/74 |
| 2002/0102220 A1 | 8/2002 | Stephenson | |
| 2002/0110632 A1 * | 8/2002 | Nunes et al. | 426/590 |
| 2003/0138384 A1 | 7/2003 | Stephenson et al. | |

OTHER PUBLICATIONS

Frayne, C. 1999. Cooling Water Treatment, Principles and Practice. Chemical Publishing Co., Inc., New York, NY. p. 30-32.*
Association of Official Analytical Chemists (AOAC); Official Methods of Analysis, Arlington, VA; 14th Edition, 1984; pp. 627-628.

* cited by examiner

*Primary Examiner* — Carolyn Paden
(74) *Attorney, Agent, or Firm* — Adam W. Borgman; S. Robert Chuey; Carl J. Roof

(57) ABSTRACT

The present disclosure relates to beverage compositions comprising low levels of preservative, without the need for hot or aseptic packing. In particular, the present invention relates to beverage compositions comprising:

(a) from about 20 ppm to about 90 ppm of a preservative selected from the group consisting of sorbic acid, benzoic acid, alkali metal salts thereof and mixtures thereof;
(b) from about 300 ppm to about 3000 ppm of a polyphosphate having the structure:

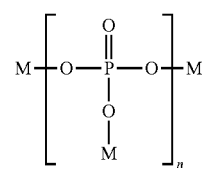

where n averages from about 3 to about 100 and each M is independently selected from the group consisting of sodium and potassium; and
(c) water;
wherein the beverage composition has a pH of from about 2 to about 5 and a total hardness of from 0 to about 300.

2 Claims, No Drawings

BEVERAGE COMPOSITIONS HAVING LOW LEVELS OF PRESERVATIVE WITH ENHANCED MICROBIAL STABILITY

CROSS REFERENCE TO RELATED APPLICATIONS

This application claims priority to U.S. Provisional Application No. 60/341,982, filed Dec. 19, 2001.

FIELD OF THE INVENTION

The present invention relates to beverage compositions having excellent microbial stability. Such stability is provided through a combination of low levels of a preservative and a polyphosphate, as well as defined pH and hardness specifications.

BACKGROUND OF THE INVENTION

Controlling microbial growth in beverage compositions is an ongoing concern among beverage manufacturers. Such beverage compositions, when exposed to food spoilage microorganisms, provide an excellent environment for rapid microbial growth, particularly wherein the beverage compositions contain fruit juice. Such exposure can result from accidental inoculation of the beverage compositions during manufacturing or packaging. Food spoilage microorganisms can then rapidly proliferate by feeding on nutrients provided by, for example, the fruit juice component of the beverage compositions.

Microbial proliferation is not likely to occur without the requisite exposure to yeast or bacteria. Manufacturing and packaging operations directed to the prevention of such exposure is preferred, but provisions are often made for any infrequent accidental exposure to the isolated beverage composition. Such provisions are directed to limiting or preventing subsequent microbial proliferation to thus limit or prevent food spoilage.

Microbial stability of beverage compositions can be provided to some extent by heat pasteurizing during packaging (hot packing) or by packaging under completely aseptic conditions (aseptic packaging). Hot packing involves pasteurization of the beverage and its container such that the resulting sealed beverage contains no food spoilage microorganism. Likewise, aseptic processing and packaging of a pasteurized beverage will produce a beverage product which is free of food spoilage microorganisms. Accordingly, these beverages are extremely shelf stable since there are no food spoilage microorganisms therein to feed on the beverage nutrients and rapidly proliferate.

Aseptic packaging methods, however, are often unsuitable for manufacturing beverages packaged in certain beverage containers, e.g., rigid containers such as glass, plastic and cans. Moreover, an aseptic or sterile environment is difficult to maintain during aseptic packaging operations. Frequent cleaning of the packaging line is necessary which is time consuming and expensive.

Hot packing methods are likewise unsuitable for manufacturing certain types of beverages. Hot packing involves heat pasteurization of the juice beverage during packaging at temperatures of from about 85° C. to about 105° C. This method is commonly utilized in the manufacture of canned or bottled (glass) beverages. However, not all beverage containers can withstand heat-pasteurization during packaging. For example, flexible containers made from high density polyethylene, which have become more popular with consumers, should not be subjected to the pasteurization temperatures utilized during hot packing operations.

In an effort to avoid such hot packing or aseptic processing, preservatives have been used in beverages to provide some degree of microbial inhibition. Preservatives commonly used in beverage products include, for example, sorbates, benzoates, organic acids, and combinations thereof. However, when utilized in the absence of other ingredients which can provide an anti-microbial effect, such preservatives often contribute an off-flavor to the beverages when used at the levels necessary to inhibit subsequent microbial proliferation during storage.

It has previously been discovered that certain noncarbonated dilute juice beverage products could be maintained at ambient temperatures for at least about 10 days without substantial microbial proliferation therein by incorporating a preservative with a linear polyphosphate. In such products, at least about 100 ppm of a preservative selected from sorbic acid, benzoic acid, alkali metal salts thereof and mixtures thereof is utilized in combination with various amounts of polyphosphate and prescribed water hardness levels. Such products are found to be microbially stable and quite effective for use in beverage products.

In working with such beverage products, however, the present inventors have quite surprisingly discovered that the level of preservative (i.e., the sorbic acid, benzoic acid, alkali metal salts thereof, and mixtures thereof) can be decreased when utilized in combination with polyphosphate, with an unexpected maintenance of anti-microbial efficacy. This result was unexpected in that it had been believed that about 100 ppm of preservative was the lowest threshold available to deliver such efficacy. Moreover, this result is quite advantageous, as it allows decreased levels of preservative which, in turn, results in a lower cost beverage composition which may be more appealing to the consumer from the aspect of flavor. These and other benefits are realized by the present invention as will be described in more detail below.

SUMMARY OF THE INVENTION

The present invention relates to beverage compositions comprising low levels of preservative, without the need for hot or aseptic packing. In particular, the present invention relates to beverage compositions comprising:

(a) from about 20 ppm to about 90 ppm of a preservative selected from the group consisting of sorbic acid, benzoic acid, alkali metal salts thereof and mixtures thereof;

(b) from about 300 ppm to about 3000 ppm of a polyphosphate having the structure:

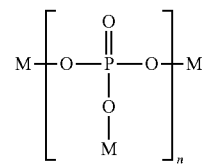

where n averages from about 3 to about 100 and each M is independently selected from the group consisting of sodium and potassium; and (c) water;

wherein the beverage composition has a pH of from about 2 to about 5 and a total hardness of from 0 to about 300.

DETAILED DESCRIPTION OF THE INVENTION

Publications and patents are referred to throughout this disclosure. All references cited herein are hereby incorporated by reference.

All percentages are calculated by weight unless otherwise indicated. All percentages are calculated based on the total composition unless otherwise indicated.

All component or composition levels are in reference to the active level of that component or composition, and are exclusive of impurities, for example, residual solvents or by-products, which may be present in commercially available sources.

Referred to herein are trade names for components including, but not limited to, fatty acid materials, pectin compounds, alginate compounds, and other optional components. The inventors herein do not intend to be limited by materials under a certain trade name. Equivalent materials (for example, those obtained from a different source under a different name or catalog number) to those referenced by trade name may be substituted and utilized in the compositions and methods herein.

In the description of the invention various embodiments and/or individual features are disclosed. As will be apparent to the ordinarily skilled practitioner, all combinations of such embodiments and features are possible and can result in preferred executions of the present invention.

The products herein may comprise, consist essentially of, or consist of any of the elements as described herein.

Compositions of the Present Invention

The present invention relates to beverage compositions having beneficial microbial stability. Such stability is provided through a combination of low levels of a preservative and a polyphosphate, as well as defined pH and hardness specifications. The compositions do not require hot packing, aseptic packing, or the incorporation of high levels of preservatives to provide the requisite inhibition of microbial proliferation during storage. Because the compositions do not require such high levels of preservatives, beverage compositions may be provided which do not exhibit the off-flavors often associated with high-level preservative use, yet maintain the microbial stability needed for an ingestible beverage.

The present beverage compositions comprise:
(a) from about 20 ppm to about 90 ppm of a preservative selected from the group consisting of sorbic acid, benzoic acid, alkali metal salts thereof and mixtures thereof;
(b) from about 300 ppm to about 3000 ppm of a polyphosphate having the structure:

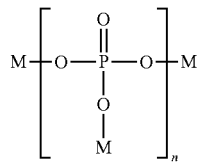

wherein n averages from about 3 to about 100 and each M is independently selected from the group consisting of sodium and potassium; and
(c) water;
wherein the beverage composition has a pH of from about 2 to about 5 and a total hardness of from 0 to about 300.

It has been surprisingly and unexpectedly discovered that the foregoing compositions are effective against microbial proliferation, thereby maintaining the microbial stability of the composition. This maintained stability is maintained despite the low level of preservative present in the composition. That such a low level of preservative would provide stability is an unexpected result, particularly given the generally higher levels of such preservatives that have been needed in the art and in commerce.

As has been discovered, the parameters needed for such stability maintenance are described herein below. In particular, the present inventors have discovered that parameters including preservative type and level, polyphosphate type and level, total water hardness, and pH should be well-defined in order to avoid compromise of microbial stability and even flavor. These parameters, and the particularly preferred embodiments therein as discovered by the inventors are defined below:

The Preservative

As has been surprisingly discovered, the inventors have found that low levels of preservative may be utilized, without the expected loss in microbial stability. In particular, the beverage compositions comprise from about 20 ppm to about 90 ppm of a preservative selected from sorbic acid, benzoic acid, alkali metal salts thereof (particularly, the potassium and/or sodium salts thereof), and mixtures thereof. Non-limiting examples include calcium sorbate, sodium sorbate, potassium sorbate, calcium benzoate, sodium benzoate, potassium benzoate, and mixtures thereof. Among these, potassium sorbate, sodium benzoate, and mixtures thereof are preferred. Even further surprisingly, benzoic acid and its alkali metal salts are particularly effective at such low levels. Accordingly, as has been discovered herein, sodium benzoate is particularly preferred for use herein.

The use of such preservatives is known, as is the mechanism by which such preservatives inhibit microbial growth. The present inventors have herein advanced the utility of such preservatives through their discovery that levels may be reduced (and most surprisingly, when utilizing sodium benzoate), in combination with polyphosphate and other parameters, without compromising stability, and while maintaining or improving flavor.

In doing so, the inventors have further discovered that the beverage compositions preferably comprise from about 30 ppm to about 90 ppm, more preferably from about 40 ppm to about 90 ppm, still more preferably from about 50 ppm to about 90 ppm, still more preferably from about 60 ppm to about 90 ppm, and even more preferably from about 70 ppm to about 90 ppm of the preservative. While in certain circumstances, relatively high levels of preservative may be desired (i.e., approaching 90 ppm), in some circumstances lower levels may be sufficient to maintain microbial stability. In this regard, then, also preferred are beverage compositions comprising from about 20 ppm to about 80 ppm, more preferably from about 20 ppm to about 70 ppm, still more preferably from about 20 ppm to about 60 ppm, and even more preferably from about 20 ppm to about 50 ppm of the preservative.

The Polyphosphate

The beverage compositions of this invention further comprise from about 300 ppm to about 3000 ppm of a polyphosphate having the structure:

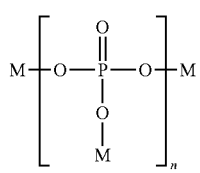

wherein n averages from about 3 to about 100 and each M is independently selected from the group consisting of sodium and potassium.

It is found by the inventors that these polyphosphates in combination with the levels of preservative described herein act synergistically, or at least additively, to inhibit the microbial growth in the beverage compositions of the present invention. This combination is particularly effective in inhibiting yeast, including preservative resistant *Zygosaccharomyces bailii*, and acid-tolerant, preservative-resistant bacteria.

Preferably, the beverage composition herein comprises from about 300 ppm to about 1500 ppm of the polyphosphate, more preferably from about 400 ppm to about 1300 ppm of the polyphosphate, even more preferably from about 500 ppm to about 1200 ppm of the polyphosphate, and most preferably from about 750 ppm to about 1100 ppm of the polyphosphate.

Moreover, the chain length of the polyphosphate is preferably such that n averages from about 10 to about 60, more preferably from about 13 to about 35, still more preferably from about 17 to about 30, and most preferably about 21. The chain length is preferably from about 17 to about 30 particularly wherein the total hardness (as described herein) is at least about 60 ppm. Also preferably, each M is sodium.

Water

Preferred beverage compositions herein are beverage concentrates and ready-to-drink beverage compositions. The compositions used herein comprise at least about 10% water, by weight of the composition. More preferably, the compositions comprise at least about 40% water, still more preferably at least about 50% water, even more preferably from about 75% to about 99.9% water, and most preferably from about 80% to about 95% water, all by weight of the composition. Still further, ready-to-drink beverage compositions will typically comprise from about 82% to about 95% water, more typically from about 84% to about 93% water, all by weight of the composition. The water present in a given composition includes all added water and any water inherently present in other components, for example, fruit or vegetable juice.

pH

The beverage compositions herein have a pH of from about 2 to about 5. Preferably, the beverage compositions have a pH of from about 2 to about 4.5. Optimal microbial stability of the present compositions is provided at pH ranges of from about 2 to about 3.5, more preferably from about 2 to about 3.3. Optimal flavor profiles are typically provided at pH ranges of from about 2.7 to about 3.5, more preferably from about 3 to about 3.3.

If necessary to adjust the pH of the composition utilized, the compositions may optionally comprise one or more acidulants. Acidity can be adjusted to and maintained within the requisite range by known and conventional methods, e.g., the use of one or more acidulants. Typically, acidity within the above-recited ranges is a balance between maximum acidity for microbial inhibition and optimum acidity for the desired beverage flavor.

Organic as well as inorganic edible acids may be used to adjust the pH of the composition. The acids can be present in their undissociated form or, alternatively, as their respective salts, for example, potassium or sodium hydrogen phosphate, potassium or sodium dihydrogen phosphate salts. The preferred acids are edible organic acids which include citric acid, malic acid, fumaric acid, adipic acid, phosphoric acid, gluconic acid, tartaric acid, ascorbic acid, acetic acid, phosphoric acid or mixtures thereof. The most preferred acids are citric acid and/or malic acids.

The acidulant can also serve as an antioxidant to stabilize beverage components. Examples of commonly used antioxidants include but are not limited to ascorbic acid, EDTA (ethylenediaminetetraacetic acid), and salts thereof.

However, in some cases acidic components need not be used. For example, the present compositions may inherently have the required pH without use of any components which tend to modify such pH.

Total Hardness

The compositions herein have a total hardness of from 0 to about 300 ppm. As used herein, "total hardness" generally refers to the presence of cations in the beverage compositions. For purposes of the present invention, total hardness of the beverage composition is calculated according to Association of Official Analytical Chemists (AOAC) standards set forth in Official Methods of Analysis, published by the AOAC, Arlington, Va., pp. 627-628 ($14^{th}$ Ed., 1984). Under AOAC standards, total hardness is the sum of $CaCO_3$ equivalents (mg/L) in water, which sum is obtained by multiplying the concentrations (mg/L) found of the following cations in the water by the factors, as indicated below in Table 1.

TABLE 1

| CATION | FACTOR |
|---|---|
| Ca | 2.497 |
| Mg | 4.116 |
| Sr | 1.142 |
| Fe | 1.792 |
| Al | 5.564 |
| Zn | 1.531 |
| Mn | 1.822 |

Thus, the compounds typically imparting hardness to beverage compositions are primarily magnesium and calcium carbonates, bicarbonates, sulfates, chlorides, and nitrates, although other compounds which can contribute cations to the compositions can also impart hardness. Water based on total hardness is normally classified as soft (from 0 to 60 ppm), moderately hard (from 61 ppm to 120 ppm), hard (from 121 ppm to 180 ppm), and very hard (over 180 ppm).

The antimicrobial effects of the present beverage compositions have been found by the present inventors to be effective at total hardness levels of from 0 ppm to about 300 ppm. Preferably, when the total hardness is from 0 to about 60 ppm, the chain length of the polyphosphate is such that n averages from about 13 to about 35. Also preferably, wherein the total hardness is from about 60 to about 300, the chain length of the polyphosphate is such that n averages from about 17 to about 30. Accordingly, depending upon the chain length chosen, the total hardness is preferably from 0 ppm to about 220 ppm, also preferably from 0 ppm to about 200 ppm, also preferably from 0 ppm to about 180 ppm, and also preferably from 0 to about 140 ppm.

Optional Components of the Present Compositions

The compositions of the present invention are beverage compositions and therefore may contain a variety of optional components. Such optional components may be dispersed, solubilized, or otherwise mixed into the present compositions. Non-limiting examples of optional components suitable for use herein are given below.

Sweeteners

The compositions of the present invention can, and typically will, contain an effective amount of one or more sweeteners, including carbohydrate sweeteners and natural and/or artificial no/low calorie sweeteners. The amount of the sweetener used in the beverages of the present invention typically depends upon the particular sweetener used and the sweetness intensity desired. For no/low calorie sweeteners, this amount varies depending upon the sweetness intensity of the particular sweetener.

The compositions of the present invention can be sweetened with any of the carbohydrate sweeteners, preferably monosaccharides and/or disaccharides. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as, for example, the fruit juice component and/or flavors.

Preferred sugar sweeteners for use in beverage products of the present invention are sucrose, fructose, glucose, and mixtures thereof, particularly sucrose and fructose. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein, as fructose. Other naturally occurring sweeteners or their purified extracts, such as glycyrrhizin, stevioside, the protein sweetener thaumatin, the juice of Luo Han Guo (containing the sweet mogrosides) disclosed in, for example, Fischer et al., U.S. Pat. No. 5,433,965, issued Jul. 18, 1995, and the like can also be used in the beverages of the present invention.

Effective levels of non-caloric or low-caloric sweeteners may optionally be used in the compositions of the present invention to further sweeten such compositions. Non-limiting examples of such sweeteners include sucralose, aspartame, saccharine, cyclamates, acesulfame K, L-aspartyl-L-phenylalanine lower alkyl ester sweeteners, L-aspartyl-D-alanine amides such as, for example, those disclosed in Brennan et al., U.S. Pat. No. 4,411,925, issued 1983, L-aspartyl-D-serine amides such as, for example, those disclosed in Brennan et aL, U.S. Pat. No. 4,399,163, issued 1983, L-aspartyl-hydroxymethyl alkane amide sweeteners such as, for example, those disclosed in U.S. Pat. No. 4,338,346, L-aspartyl-1-hydroxyethylalkane amide sweeteners such as, for example, those disclosed in U.S. Pat. No. 4,423,029, glycyrrhizins, and synthetic alkoxy aromatics. Sucralose (1,6-dichloro-1,6-dideoxy-beta-D-fructofuranosyl, 1,4-chloro-4-deoxy-alpha-D-galactopyranoside) is described in U.S. Pat. Nos. 4,343,934 and 4,435,440. Aspartame and acesulfame-K are the most preferred non-caloric sweeteners utilized herein, and may be utilized alone or in combination.

Wherein one or more sweeteners are utilized herein, the total sweetener is preferably utilized at various levels, particularly depending upon the sweetness desired and/or whether the beverage composition is a ready-to-drink beverage composition or a beverage concentrate. Typical levels may range from about 0.0001% to about 50%, 0.001% to about 20%, 0.001% to about 15%, 0.005% to about 11%, 1% to about 10%, or from about 5% to about 9%, by weight of the composition.

Nutrients

The compositions herein may optionally be fortified with one or more vitamins or minerals, which are referred to herein as nutrients, provided such nutrients do not substantially reduce the microbial stability of the beverage compositions and further provided that the nutrients are compatible with the essential components of the beverage compositions. Vitamins are preferred nutrients.

The U.S. Recommended Daily Intake (USRDI) for vitamins and minerals is defined and set forth in the Recommended Daily Dietary Allowance-Food and Nutrition Board, National Academy of Sciences-National Research Council. Unless otherwise specified herein, wherein a given vitamin is present in the composition, the composition comprises at least about 1%, preferably at least about 5%, more preferably from about 10% to about 200%, even more preferably from about 10% to about 150%, and most preferably from about 10% to about 100% of the USRDI of such vitamin. Unless otherwise specified herein, wherein a given mineral other than boron is present in the composition, the composition typically comprises at least about 1%, preferably at least about 5%, more preferably from about 5% to about 100%, even more preferably from about 10% to about 40%, and most preferably from about 10% to about 30% of the USRDI of such mineral.

Non-limiting examples of vitamins include vitamin A, one or more B-complex vitamins (which include one or more of thiamine (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin $B_6$"), biotin, folic acid (also commonly referred to as folate), and the cobalamins (also commonly referred to as "vitamin $B_{12}$")), vitamin C, vitamin D, and vitamin E. Preferably, at least one vitamin is selected from vitamin A, niacin, thiamine, folic acid, pyroxidine, pantothenic acid, vitamin C, vitamin E, and vitamin D. Preferably, at least one vitamin is selected from vitamin A, thiamine, pyroxidine, pantothenic acid, vitamin C, and vitamin E.

As used herein, "vitamin A" is inclusive of one or more nutritionally active unsaturated hydrocarbons, including the retinoids (a class of compounds including retinol and its chemical derivatives having four isoprenoid units) and the carotenoids. Common retinoids include retinol, retinal, retinoic acid, retinyl palmitate, and retinyl acetate.

In a preferred embodiment herein, the vitamin A is a carotenoid. Common carotenoids include beta-carotene, alpha-carotene, beta-apo-8'-carotenal, cryptoxanthin, canthaxanthin, astacene, and lycopene. Among these, beta-carotene is the most preferred for use herein.

The vitamin A may be in any form, for example, an oil, beadlets, or encapsulated. See e.g., U.S. Pat. No. 6,007,856. Vitamin A is often available as an oil dispersion, i.e., small particles suspended in oil.

Wherein vitamin A is present in the compositions herein, the composition typically comprises, per single serving of the composition (typically, about 236 milliliters of total composition), at least about 1%, preferably at least about 5%, more preferably from about 10% to about 200%, even more preferably from about 15% to about 150%, and most preferably from about 10% to about 120% of the USRDI of such vitamin. Wherein vitamin A is present in the compositions herein, it is especially preferred to include about 25% of the USRDI of vitamin A, per single serving of the composition. Alternatively, the compositions preferably comprise from 0% to about 1%, more preferably from about 0.0001% to about 0.5%, also preferably from about 0.0001% to about 0.25%, even more preferably from about 0.0001% to about 0.1%, and most preferably from about 0.0002% to about 0.08% of vitamin A, by weight of the composition. The ordinarily skilled artisan will understand that the quantity of vitamin A to be added is dependent on processing conditions and the amount of vitamin A delivery desired after storage.

As stated the vitamin used herein may be a B-complex vitamin. As used herein, the B-complex vitamins include one or more of thiamine (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin $B_6$"), biotin, folic acid (also commonly referred to as folate), and the cobalamins (also commonly referred to as "vitamin $B_{12}$"). Among these, inclusion of vitamin $B_1$ and/or $B_6$ are particularly preferred.

Wherein a B-complex vitamin is present in the compositions herein, the composition typically comprises at least about 1%, preferably at least about 5%, more preferably from about 10% to about 200%, even more preferably from about 15% to about 150%, and most preferably from about 10% to about 50% of the USRDI of each B-complex vitamin present in the composition, per single serving of the composition (typically, about 236 milliliters of total composition). Wherein a B-complex vitamin is present in the compositions herein, it is especially preferred to include from about 10% to about 50% of the USRDI of each B-complex vitamin present in the composition, per single serving of the composition. Alternatively, wherein a B-complex vitamin is included within the present compositions, the compositions typically comprise from 0% to about 2%, more preferably from about 0.0001% to about 1%, also preferably from about 0.0001% to about 0.2%, even more preferably from about 0.0001% to about 0.1%, and most preferably from about 0.0001% to about 0.04% of each B-complex vitamin present in the composition, by weight of the composition. The ordinarily skilled artisan will understand that the quantity of B-complex vitamin to be added is dependent on processing conditions and the amount of B-complex vitamin delivery desired after storage.

As used herein, "vitamin C" is inclusive of one or more of L-ascorbic acid, as well as their bioequivalent forms including salts and esters thereof. For example, the sodium salt of L-ascorbic acid is considered vitamin C herein. Additionally, there are many widely known esters of vitamin C, including ascorbyl acetate. Fatty acid esters of vitamin C are lipid soluble and can provide an antioxidative effect.

The vitamin C utilized may be in any form, for example, free or in encapsulated form.

Wherein vitamin C is present in the compositions herein, the composition typically comprises at least about 1%, preferably at least about 5%, more preferably from about 10% to about 200%, even more preferably from about 15% to about 150%, and most preferably from about 20% to about 120% of the USRDI of such vitamin, per single serving of the composition (typically, about 236 milliliters of total composition). Wherein vitamin C is present in the compositions herein, it is especially preferred to include about 100% of the USRDI of vitamin C, per single serving of the composition. Alternatively, wherein vitamin C is included within the present compositions, the compositions typically comprise from 0% to about 2%, more preferably from about 0.0002% to about 1%, also preferably from about 0.0003% to about 0.5%, even more preferably from about 0.0005% to about 0.2%, and most preferably from about 0.001% to about 0.1% of vitamin C, by weight of the composition. The ordinarily skilled artisan will understand that the quantity of vitamin C to be added is dependent on processing conditions and the amount of vitamin C delivery desired after storage.

As used herein, "vitamin E" is inclusive of one or more tocols or tocotrienols which exhibit vitamin activity similar to that of alpha-tocopherol (which, as used herein, is considered a tocol) as well as their bioequivalent forms including salts and esters thereof. Vitamin E is typically found in oils including, for example, sunflower, peanut, soybean, cottonseed, corn, olive, and palm oils.

Non-limiting examples of vitamin E include alpha-tocopherol, beta-tocopherol, gamma-tocopherol, and delta-tocopherol, as well as esters thereof (e.g., alpha-tocopherol acetate). Alpha-tocopherol and particularly alpha-tocopherol acetate are highly preferred for use as vitamin E herein.

The vitamin E utilized may be in any form, for example, free or in encapsulated form.

Wherein vitamin E is present in the compositions herein, the composition typically comprises at least about 1%, preferably at least about 5%, more preferably from about 10% to about 200%, even more preferably from about 15% to about 150%, and most preferably from about 20% to about 120% of the USRDI of such vitamin, per single serving of the composition (typically, about 236 milliliters of total composition). Wherein vitamin E is present in the compositions herein, it is especially preferred to include about 25% of the USRDI of vitamin E, per single serving of the composition. Alternatively, wherein vitamin E is included within the present compositions, the compositions typically comprise from 0% to about 2%, more preferably from about 0.0002% to about 1%, also preferably from about 0.0003% to about 0.2%, even more preferably from about 0.0005% to about 0.1%, and most preferably from about 0.001% to about 0.1% of vitamin E, by weight of the composition. The ordinarily skilled artisan will understand that the quantity of vitamin E to be added is dependent on processing conditions and the amount of vitamin E delivery desired after storage.

Emulsions

Dilute juice beverages of the present invention may optionally comprise from about 0.2% to about 5%, preferably from about 0.5% to about 3%, and most preferably from about 0.8% to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils may be employed as the clouding agent, provided that the fat or oil is suitable for use in foods and/or beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See e.g., U.S. Pat. No. 4,705,691 for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See e.g., U.S. Pat. No. 4,705,691. Modified starches treated to contain hydrophobic as well as hydrophilic groups, such as those described in U.S. Pat. No. 2,661,349, are preferred emulsifiers for use as herein. Octenyl succinate (OCS) modified starches such as those described in U.S. Pat. Nos 3,455,838 and 4,460,617 are also preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters which are nondigestible. See e.g., U.S. Pat. No. 4,705,690.

The cloud/opacifier emulsion may be prepared by mixing the clouding agent with the weighting agent (for opacifier emulsions), the emulsifier and water. The emulsion typically contains from about 0.1% to about 25% clouding agent, from about 1% to about 20% weighting oil agent (in the case of opacifier emulsions), from about 1% to about 30% emulsifiers, and from about 25% to about 97.9% water (or quantum satis).

Flavor emulsions useful in beverage products of the present invention comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include, for example, fruit flavors such as orange, lemon, lime and the like, cola flavors, tea flavors, coffee flavors, chocolate flavors, dairy flavors. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See e.g., U.S. Pat. No. 4,705,691.

Flavor emulsions are typically prepared in the same manner as cloud/opacifier emulsions by mixing one or more flavoring oils (from about 0.001% to about 20%) with an emulsifying agent (from about 1% to about 30%) and water. (The oil clouding agents can also be present). Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an appropriate dispersion. The viscosity and specific gravity of the flavor emulsion are regulated to be compatible with the finished beverage. See e.g., U.S. Pat. No. 4,705,691.

Flavoring Agents

One or more flavoring agents are recommended for the embodiments of the present invention in order to enhance their palatability. Any natural or synthetic flavor agent can be used in the present invention. For example, one or more of fruit juice, botanical and/or fruit flavors may be utilized herein.

In one embodiment of the present invention, the beverage products contain fruit juice, which can provide flavor and nutrition. Ordinarily, fruit juice provides an excellent medium on which beverage spoilage microorganisms can feed and rapidly proliferate. The present antimicrobial beverage compositions are found to be quite useful in the presence of fruit juice.

Specifically, the beverage compositions of the present invention may preferably comprise from about 0.1% to about 40%, more preferably from about 0.1% to about 20%, even more preferably from about 0.1% to about 15%, and most preferably from about 3% to about 10% of fruit juice (weight percentage based on single strength 2-16° Brix fruit juice). The fruit juice can be incorporated into the beverage composition as a puree, comminute or as a single strength or concentrated juice. Especially preferred is the incorporation of the fruit juice as a concentrate with a solid content (primarily as sugar solids) of between about 20° and 80° Brix.

The fruit juice in the beverage composition can be any citrus juice, non-citrus juice, or mixture thereof. Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice, and mixtures thereof. Other fruit juices, and non-fruit juices such as vegetable or botanical juices, can be used as the juice component of the noncarbonated beverage products of the present invention.

Wherein a flavor is utilized, particularly preferred fruit flavors are exotic and lactonic flavors such as, for example, passion fruit flavors, mango flavors, pineapple flavors, cupuacu flavors, guava flavors, cocoa flavors, papaya flavors, peach flavors, and apricot flavors. Besides these flavors, a variety of other fruit flavors can be utilized such as, for example, apple flavors, citrus flavors, grape flavors, raspberry flavors, cranberry flavors, cherry flavors, grapefruit flavors, and the like. These fruit flavors can be derived from natural sources such as fruit juices and flavor oils, or may alternatively be synthetically prepared.

Preferred botanical flavors include, for example, tea (preferably black and green tea, most preferably green tea), aloe vera, guarana, ginseng, ginkgo, hawthorn, hibiscus, rose hips, chamomile, peppermint, fennel, ginger, licorice, lotus seed, schizandra, saw palmetto, sarsaparilla, safflower, St. John's Wort, curcuma, cardimom, nutmeg, cassia bark, buchu, cinnamon, jasmine, haw, chrysanthemum, water chestnut, sugar cane, lychee, bamboo shoots, vanilla, coffee, and the like. Preferred among these are tea, guarana, ginseng, ginko, and coffee. In particular, the combination of tea flavors, preferably green tea or black tea flavors (preferably green tea), optionally together with fruit flavors has an appealing taste. In another preferred embodiment, coffee is included within the present compositions. A combination of green tea and coffee in the present compositions is often preferred.

The flavor agent can also comprise a blend of various flavors. If desired, the flavor in the flavoring agent may be formed into emulsion droplets that are then dispersed in the beverage composition or concentrate. Because these droplets usually have a specific gravity less than that of water and would therefore form a separate phase, weighting agents (which can also act as clouding agents) can be used to keep the emulsion droplets dispersed in the beverage composition or concentrate. Examples of such weighting agents are brominated vegetable oils (BVO) and resin esters, in particular the ester gums. See L. F. Green, Developments in Soft Drinks Technology, Vol. 1, Applied Science Publishers Ltd., pp. 87-93 (1978) for a further description of the use of weighting and clouding agents in liquid beverages. Typically the flavoring agents are conventionally available as concentrates or extracts or in the form of synthetically produced flavoring esters, alcohols, aldehydes, terpenes, sesquiterpenes, and the like.

Coloring Agent

Small amounts of one or more coloring agents may be utilized in the compositions of the present invention. FD&C dyes (e.g., yellow #5, blue #2, red #40) and/or FD&C lakes are preferably used. Preferred lakes which may be used in the present invention are the FDA-approved Lake, such as Lake red #40, yellow #6, blue #1, and the like. Additionally, a mixture of FD&C dyes or a FD&C lake dye in combination with other conventional food and food colorants may be used. Riboflavin and beta-carotene may also be used. Additionally, other natural coloring agents may be utilized including, for example, fruit, vegetable, and/or plant extracts such as grape, black currant, aronia, carrot, beetroot, red cabbage, and hibiscus.

The amount of coloring agent used will vary, depending on the agents used and the intensity desired in the finished product. Generally, if utilized, the coloring agent should be present at a level of from about 0.0001% to about 0.5%, preferably from about 0.001% to about 0.1%, and most preferably from about 0.004% to about 0.1%, by weight of the composition.

Carbonation Component

Carbon dioxide can be introduced into the water that is mixed with a beverage concentrate or into a beverage composition after dilution to achieve carbonation. The carbonated beverage can be placed into a container, such as a bottle or can, and then sealed. Any conventional carbonation methodology may be utilized to make carbonated beverage compositions of this invention. The amount of carbon dioxide introduced into the beverage will depend upon the particular flavor system utilized and the amount of carbonation desired.

Method of Making

The beverage compositions of the present invention can be prepared by conventional methods. Such conventional methods can involve hot packing or aseptic packaging operations, although such operations are not necessary for achieving microbial stability of the present compositions.

Methods for making dilute juice beverages, for example, are described in U.S. Pat. No. 4,737,375. Methods for making beverage products are also described by Woodroof and Phillips, *Beverages: Carbonated& Noncarbonated*, AVI Publishing Co. (Rev. Ed., 1981); and by Thorner and Herzberg, *Non-alcoholic Food Service Beverage Handbook*, AVI Publishing Co. (2nd Ed., 1978).

For example, a method for preparing the beverage compositions herein can involve making a beverage concentrate, adding it to a sugar syrup containing the polyphosphate, and then trimming the mixture with water, sugar syrup, and beverage concentrate to obtain the requisite acidity and material composition. In such a method, the beverage concentrate can be prepared by admixing to water an acidulant (e.g., citric acid), vitamins, flavorants (e.g., juice concentrate), and the preservative. An oil-in-water emulsion, which provides opacity and texture to the beverage products, can be added to the concentrate. The sugar syrup for use in preparing the beverage products is separately prepared by adding sugar syrup (e.g., high fructose corn syrup) to water, and then adding ascorbic acid, polyphosphate and thickening agents to the syrup. The sugar syrup and concentrate are combined to form the beverage composition. The composition can then be pasteurized, packaged, and stored.

This described method is non-limiting to the present invention. Other well-known and conventional variations of the above described beverage formulation technique can, therefore, be used to prepare the beverage compositions herein.

Analytical Methods

Microbial Stability. The term "microbial proliferation" as used herein means a 100 fold increase or greater in the number of beverage spoilage microorganisms in a beverage composition after an initial inoculation level of about 10 cfu/ml. As used herein, "microbially stable" beverage compositions exhibit less than a 100-fold increase in the level of microorganisms when stored at 73° F. for at least 28 days, following an initial contamination level of 10 cfu/ml of spoilage microorganisms.

The microbial stability of a beverage composition can be determined by the following method. Beverage compositions are inoculated with mixed groups of preservative resistant yeast containing at least four separate yeast isolates, including *Zygosaccharomyces bailii*, with mixed groups of preservative-resistant, acid-tolerant bacteria, including *Acetobacter* species. All yeast and bacteria utilized in the inoculation are previously isolated from preserved fruit juice beverages. Inoculated beverage products are maintained at 20° C. for at least 60 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage product.

Average Chain Length of Polyphosphate: The average chain length of the polyphosphate utilized herein ("n") may be determined by Nuclear Magnetic Resonance (NMR), as follows:

| Reagents and Equipment: | |
|---|---|
| Deuterium Oxide ($D_2O$) | |
| NMR tubes | 5 mm OD, Wilmad Glass, 507PP |
| | 10 mm OD, Wilmad Glass, 513-5PP |
| NMR tube pressure caps | 5 mm OD, Wilmad Glass, 521 |
| | 10 mm OD, Wilmad Glass, 521-C |
| Disposable transfer pipets | Curtin Matheson, 355-123 |
| Probe for AC-300 | 5 or 10 mm |
| Pyrex wool | Corning Glass |
| Disposable wipers | Kimberly-Clark, Kim-Wipes |
| NMR Spinner Turbine | 5 mm, Bruker |
| | 10 mm, Bruker |
| NMR Spectrometer | Bruker AC-300, equipped with 5 mm or 10 mm probe |

Procedure:
1. Dissolve about 100 mg of sample containing the polyphosphate in deuterium oxide ($D_2O$) to prepare a solution having a concentration of about 12%, by weight of sample. Warm solution gently, if necessary, to aid in solute dissolution. Filter the solution through compressed PYREX wool, if necessary, to remove any solid particles.

2. Transfer the solution to a clean NMR tube, using a disposable pipet.
3. Place cap on NMR tube. Wipe all smudges and dust particles off the NMR tube with a disposable wiper.
4. Position the sample tube using the depth gauge.
5. Place the sample tube/spinner/holder assembly into the NMR spectrometer.
6. Obtain the processed and plotted spectrum.

| Spectrometer Parameters: | |
| --- | --- |
| Microprogram | PHG |
| Sweep Frequency | 121.39 MHz |
| Sweep Width | 50 KHz |
| Spectrum Size | 64 K |
| Pulse Width | 2 usec = 45° |
| Pulse Recycle | 10.0 sec |
| Inverse gated broadband H-1 decoupling | |

The average chain length of the polyphosphate is calculated as follows:

$$\text{Average chain length} = 2\left(\frac{\text{Integrated Peak Area } I + \text{Integrated Peak Area } T}{\text{Integrated Peak Area } T}\right)$$

Region T from −5 to −−10 ppm contains peaks assigned to terminal phosphate units in linear polyphosphates having a chain length of 2 or greater. Region I from −18 to −24 ppm contains peaks assigned to internal phosphates. Cyclic phosphates present as impurities in the samples also have peaks in Region I and are included in the calculation. The chemical shifts were referenced to external phosphoric acid.

EXAMPLES

The following includes non-limiting examples of the present beverage compositions, as well as non-limiting processes for making such compositions. Ingredients for each product are admixed in the order in which they appear. The polyphosphate for each composition is admixed under high sheer mixing to insure solubility. Ambient display time for each product is at least about 28 days. These examples are illustrative of the invention and are not intended to be limiting.

Example 1

| Ingredients | Amount (in weight percent, unless otherwise indicated) |
| --- | --- |
| Water | Quantum Satis |
| High Fructose Corn Syrup | 13 |
| Fruit juices (including grapefruit, orange, apple, tangerine, and lime) | 5.2% Juice, on a single strength basis |
| Natural Flavors | 1 |
| Thickeners | 0.1 |
| Vitamins (Vitamin A from β-carotene, Vitamin B$_1$, Vitamin C) | 0.1 |
| Artificial Colors | 0.01 |
| Sodium Benzoate | 0.0085 (i.e., 85 ppm) |
| Sodium Hexametaphosphate (n averages about 21) | 0.1 |

The pH of the composition is adjusted to about 3 using citric acid. The total hardness of the composition is about 140 ppm.

Example 2

| Ingredients | Amount (in weight percent, unless otherwise indicated) |
| --- | --- |
| Water | Quantum Satis |
| High Fructose Corn Syrup | 13.5 |
| Fruit Juice | 10% Juice, on a single strength basis |
| Natural Flavors | 1 |
| Thickeners | 0.5 |
| Vitamins (Vitamin A from β-carotene, Vitamin B$_1$, Vitamin C) | 0.1 |
| Artificial Colors | 0.1 |
| Sodium Benzoate | 0.0083 (i.e., 83 ppm) |
| Sodium Hexametaphosphate (n averages about 23) | 0.09 |

The pH of the composition is adjusted to about 3 using citric acid. The total hardness of the composition is about 140 ppm.

Example 3

| Ingredients | Amount (weight percent, unless otherwise indicated) |
| --- | --- |
| Water | Quantum Satis |
| High Fructose Corn Syrup | 10 |
| Aspartame | 0.05 |
| Fruit Juice | 10% Juice, on a single strength basis |
| Natural Flavors | 1 |
| Thickeners | 0.5 |
| Vitamins (Vitamin A from β-carotene, Vitamin B$_1$, Vitamin C) | 0.1 |
| Artificial Colors | 0.1 |
| Potassium Sorbate | 0.002 (i.e., 20 ppm) |
| Sodium Benzoate | 0.006 (i.e., 60 ppm) |
| Sodium Hexametaphosphate (n averages about 21) | 0.15 |

The pH of the composition is adjusted to about 2.5 using citric acid. The total hardness of the composition is about 180 ppm.

Example 4

| Ingredients | Amount (in weight percent, unless otherwise indicated) |
| --- | --- |
| Water | Quantum Satis |
| High Fructose Corn Syrup | 13 |
| Fruit Juice | 5.2% Juice, on a single strength basis |
| Flavors | 0.04 |
| Thickeners | 0.05 |
| Emulsion | 1 |
| Vitamins (Vitamin B$_1$, Vitamin C) | 0.04 |
| Artificial Colors | 0.004 |
| Sodium Benzoate | 0.0025 (i.e., 25 ppm) |
| Sodium Hexametaphosphate (n averages about 21) | 0.10 |

Example 5

| Ingredients | Amount (in weight percent, unless otherwise indicated) |
|---|---|
| Water | Quantum Satis |
| High Fructose Corn Syrup | 13 |
| Fruit Juice | 5.2% Juice, on a single strength basis |
| Flavors | 0.04 |
| Thickeners | 0.05 |
| Emulsion | 1 |
| Vitamins (Vitamin $B_1$, Vitamin C) | 0.04 |
| Artificial Colors | 0.004 |
| Sodium Benzoate | 0.0050 (i.e., 50 ppm) |
| Sodium Hexametaphosphate (n averages about 21) | 0.10 |

The pH of the composition is adjusted to about 3.0 using citric acid. The total hardness of the composition is about 140 ppm.

What is claimed is:

1. A beverage composition comprising:
   (a) from about 20 ppm to about 50 ppm of a preservative consisting of sodium benzoate;
   (b) from about 300 ppm to about 1500 ppm of a polyphosphate having the structure:

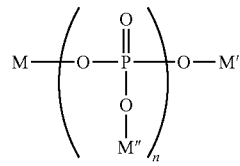

wherein each M is independently selected from the group consisting of sodium and potassium;
   (c) water; and
   (d) from about 0.1% to about 40% fruit juice, by weight of the composition;
wherein the beverage composition has a pH of from about 2 to about 5 and a total hardness of from 0 to about 300, and wherein the beverage composition is microbially stable such that the beverage composition would exhibit less than a 100-fold increase in the level of microorganisms when stored at 73° F. for at least 28 days, following an initial contamination level of 10 cfu/mL of spoilage microorganisms; wherein the beverage composition is not hot packed, aseptically packed, or combinations thereof; and wherein when the total hardness due to magnesium and calcium is from about 0 ppm to about 60 ppm, n averages from about 13 to about 35 and when the total hardness is from about 60 ppm to about 300 ppm, n is from about 17 to about 30.

2. The composition according to claim 1 wherein each M is sodium.

* * * * *